United States Patent
Shirakawa et al.

(10) Patent No.: US 9,729,354 B2
(45) Date of Patent: Aug. 8, 2017

(54) CABLE SIGNAL DETECTOR

(71) Applicant: Hitachi Metals, Ltd., Tokyo (JP)

(72) Inventors: Yohei Shirakawa, Hitachi (JP); Koki Hirano, Hitachinaka (JP); Yoshitake Ageishi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/929,292

(22) Filed: Oct. 31, 2015

(65) Prior Publication Data

US 2016/0133110 A1  May 12, 2016

(30) Foreign Application Priority Data

Nov. 11, 2014 (JP) .................. 2014-228956

(51) Int. Cl.
*G08B 21/00* (2006.01)
*H04L 12/64* (2006.01)
*H04B 10/07* (2013.01)

(52) U.S. Cl.
CPC ......... *H04L 12/6418* (2013.01); *H04B 10/07* (2013.01)

(58) Field of Classification Search
CPC .. G01R 19/2513; G01R 31/02; G01R 31/026; G01R 31/041; G01R 31/086; G01R 19/145; H01R 13/6691; H01R 24/64; H01R 13/66; H01R 13/665; H01R 31/005; G08B 21/18; G08B 21/182; H04L 12/00; H04L 12/6418; H04L 29/06; H04L 12/413; H04B 10/07

USPC .......... 340/653, 635, 645, 657, 651
See application file for complete search history.

(56) References Cited

U.S. PATENT DOCUMENTS

| 5,504,811 | A | * | 4/1996 | Kiko | H04B 3/36 |
| | | | | | 379/345 |
| 5,555,015 | A | * | 9/1996 | Aguayo, Jr. | H04N 7/17309 |
| | | | | | 348/E7.07 |
| 7,019,658 | B1 | * | 3/2006 | Erickson | H01R 13/641 |
| | | | | | 340/635 |
| 2008/0204034 | A1 | * | 8/2008 | Blades | G01R 31/041 |
| | | | | | 324/522 |
| 2013/0217249 | A1 | | 8/2013 | Patel et al. | |

FOREIGN PATENT DOCUMENTS

JP    5274671 B2    8/2013

* cited by examiner

*Primary Examiner* — Anh V La
(74) *Attorney, Agent, or Firm* — McGinn IP Law Group, PLLC

(57) ABSTRACT

A cable signal detector for being provided at a connector at an end of a communication cable transmitting differential signals or at a relay connector to be connected to the connector to detect an existence of information communication. The cable signal detector includes an amplifier circuit that branches and extracts a portion of a signal transmitted through the communication cable, amplifies the extracted signal and outputs the amplified signal, and a display portion that display the existence of information communication based on the output of the amplifier circuit. The amplifier circuit is mounted on a detection device formed separately from the connector or the relay connector. The connector or the relay connector is configured to transmit the extracted signal to the detection device.

17 Claims, 2 Drawing Sheets

CABLE SIGNAL DETECTOR

The present application is based on Japanese patent application No. 2014-228956 filed on Nov. 11, 2014, the entire contents of which are incorporated herein by reference.

BACKGROUND OF THE INVENTION

1. Field of the Invention

The invention relates to a cable signal detector.

2. Description of the Related Art

In data centers etc., the connection of a communication cable such as a LAN (Local Area Network) cable may be altered in accordance with layout change, displacement or addition of information and communication device such as a server or a hub.

Some information and communication devices are provided with a connection check lamp for checking the connection of communication cables so as to determine whether or not the communication cable is connected.

Also, a device has been proposed in which the connection of the communication cable is monitored by detecting the insertion and removal of the connector of the communication cable (see e.g., JP-B-5274671).

SUMMARY OF THE INVENTION

The conventional devices can only check the physical connection of the communication cable. Thus, it is not possible to check whether the communication is actually established through the communication cable.

The communication cable may be erroneously removed without noticing the establishment of communication. Thus, a failure may be caused which includes a service shutdown of the information communication device and a data corruption during transfer.

Where the connection of the communication cable is monitored as in JP-B-5274671, the communication cable needs a built-in monitoring signal line. Since a versatile communication cable is thus difficult to use therewith, the manufacturing cost may increase.

In detecting the existence of communication, it is necessary to prevent the deterioration of signal transmitted through the communication cable.

Although a connector at an end of a communication cable or a relay connector to be connected to the connector may be provided with a function of displaying the existence of information communication, it is otherwise necessary to avoid an increase in size of the connector or the relay connector.

It is an object of the invention to provide a cable signal detector that is downsized, displays the existence of information communication to prevent the communication cable from being erroneously removed, uses a versatile communication cables as the communication cable, and prevents the deterioration of a signal transmitted through the communication cable.

(1) According to an embodiment of the invention, a cable signal detector for being provided at a connector at an end of a communication cable transmitting differential signals or at a relay connector to be connected to the connector to detect an existence of information communication comprises:

an amplifier circuit that branches and extracts a portion of a signal transmitted through the communication cable, amplifies the extracted signal and outputs the amplified signal; and a display portion that display the existence of information communication based on the output of the amplifier circuit, wherein the amplifier circuit is mounted on a detection device formed separately from the connector or the relay connector, and wherein the connector or the relay connector is configured to transmit the extracted signal to the detection device.

In the above embodiment (1) of the invention, the following modifications and changes can be made.

(i) The cable signal detector further comprises a rectifier circuit that rectifies the signal amplified by the amplifier circuit into a DC signal and outputs the DC signal, wherein the rectifier circuit is provided at the detection device.

(ii) The cable signal detector further comprises a matching circuit for adjusting the level of the signal extracted from the communication cable, wherein the matching circuit is provided at one of the connector, the relay connector and the detection device.

(iii) The connector or the relay connector comprises a connector-side electrode electrically connected to a signal line of the communication cable, wherein the detection device comprises a detection device-side electrode connected to the connector-side electrode, and wherein a signal transmitted through the communication cable is received by the detection device upon connecting the detection device-side electrode to the connector-side electrode.

Effects of the Invention

According to an embodiment of the invention, a cable signal detector can be provided that is downsized, displays the existence of information communication to prevent the communication cable from being erroneously removed, uses a versatile communication cables as the communication cable, and prevents the deterioration of a signal transmitted through the communication cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

An embodiment of the invention will be described below in conjunction with the appended drawings.

Figure 1A:
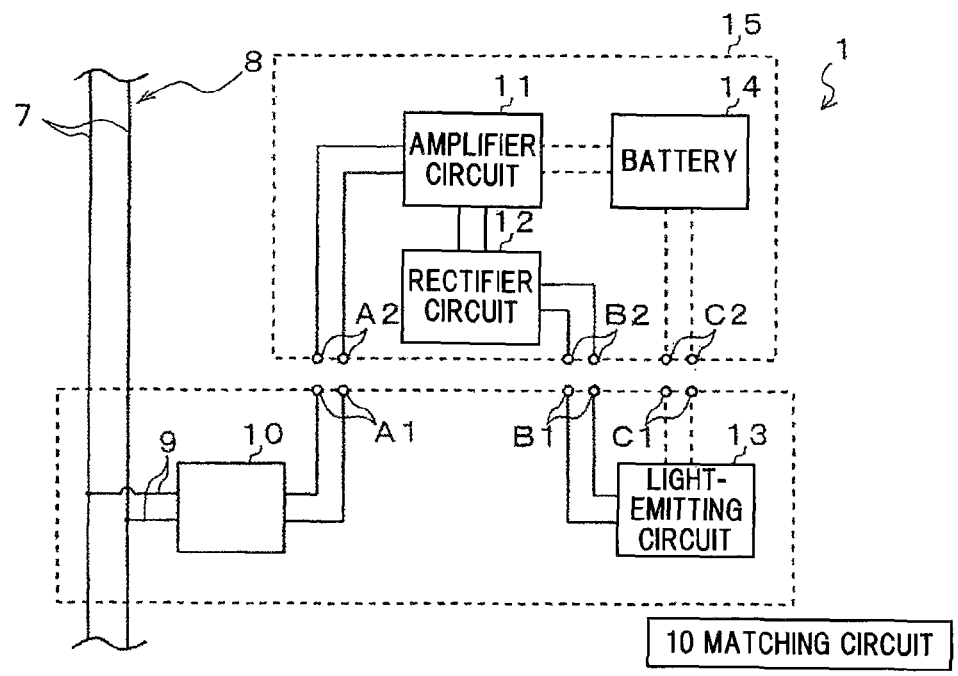
FIG. 1A is an illustration diagram showing a cable signal detector in an embodiment of the present invention.
Figure 1B:
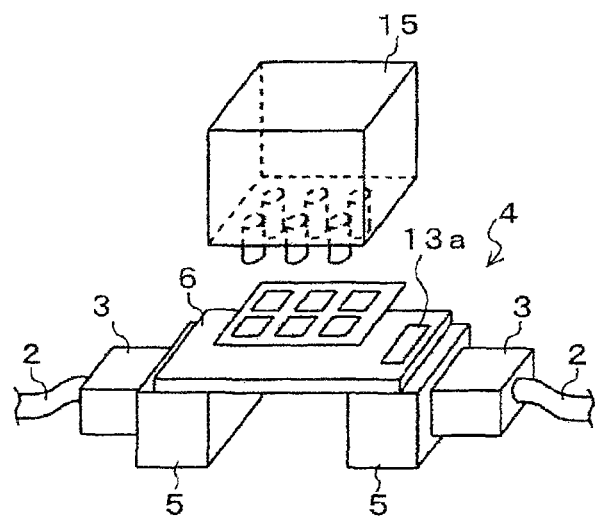
FIG. 1B is a perspective view showing a relay connector and a detection device.

FIG. 1A is an illustration diagram showing a cable signal detector in an embodiment of the present invention. FIG. 1B is a perspective view showing a relay connector and a detection device.

As shown in FIGS. 1A and 1B, a cable signal detector 1 is provided in a connector 3 provided at an end of a communication cable 2 transmitting differential signals or, in a relay connector 4 to be connected to the connector 3, to detect a communication state. The cable signal detector 1 when provided in the relay connector 4 will described here.

As the communication cable 2, it is possible to use a universal LAN (Local Area Network) cable. The communication cable 2 having four pairs of signal lines (eight in total) for transmitting differential signals is used in the present embodiment.

The relay connector 4 is provided with two connectors 5, and the communication cables 2 connected to the two connectors 5 are connected to each other via the relay connector 4. The connector 5 is, e.g., a jack connector conforming to the RJ45 standard and is connectable to the connector 3 (e.g., a plug connector conforming to the RJ45 standard) provided at an end of the communication cable 2.

The connectors 5 are both mounted on a circuit board 6. The communication cable 2 used in the present embodiment has four pairs of signal lines for transmitting differential signals. Therefore, a signal transmission unit 8 having four pairs of transmission paths 7 corresponding four signal transmission pairs is formed between the two connectors 5. The signal transmission unit 8 is mounted on the circuit board 6.

The cable signal detector 1 is provided with a matching circuit 10, an amplifier circuit 11, a rectifier circuit 12 and a light-emitting circuit 13 as a display portion.

The matching circuit 10 is to provide impedance matching in a predetermined frequency band. In the present embodiment, since a portion of a signal transmitted through the signal lines of the communication cable 2 (through the transmission paths 7 of the signal transmission unit 8) is branched and extracted, the matching circuit 10 also serves to adjust the level of a signal extracted from the communication cable 2.

In the present embodiment, branch transmission paths 9 branched from a given pair of the transmission paths 7 enter the matching circuit 10. The matching circuit 10 is constructed from, e.g., a resistive circuit.

The amplifier circuit 11 is a circuit which amplifies the signal extracted from a given signal line of the communication cable 2 (the transmission path 7 of the signal transmission unit 8) through the matching circuit 10 and outputs the amplified signal to the downstream rectifier circuit 12. As the amplifier circuit 11, it is possible to use, e.g., a grounded emitter circuit. However, the specific configuration of the amplifier circuit 11 is not limited thereto. Although the amplifier circuit 11 is a single-stage configuration in the present embodiment, the amplifier circuit 11 may be a multistage configuration.

The rectifier circuit 12 rectifies the AC signal amplified by the amplifier circuit 11 into a DC signal and outputs the DC signal to the downstream comparator 13. As the rectifier circuit 12, it is possible to use a well-known full-wave rectifier circuit or half-wave rectifier circuit.

The light-emitting circuit 13 as a display portion indicates the communication state by light emission based on the output from the rectifier circuit 12. The light-emitting circuit 13 has a light emitting element such as light-emitting diode and is configured to control the light emitting-element to emit light according to the output of the rectifier circuit 12. A light-emitting portion 13a which emits light using the light emitting-element is mounted on the circuit board 6. The light-emitting portion 13a may be the light emitting-element itself.

The amplifier circuit 11 and the light-emitting circuit 13 are configured to receive power from a battery 14.

In the cable signal detector 1 of the present embodiment, the amplifier circuit 11 is mounted on a detection device 15 formed separately from the relay connector 4, and the relay connector 4 is configured to transmit the signal extracted from the communication cable 2 to the detection device 15.

In the present embodiment, the amplifier circuit 11, the rectifier circuit 12 and the battery 14 are mounted on the detection device 15, and the matching circuit 10 and the light-emitting circuit 13 are mounted on the relay connector 4.

By mounting the amplifier circuit 11 on the detection device 15 which is formed separately from the relay connector 4, it is possible to suppress deterioration in signal quality caused because the output signal of the amplifier circuit 11 enters the communication cable 2. Also, the size of the relay connector 4 can be smaller than the case where the amplifier circuit 11 is provided on the relay connector 4.

The relay connector 4 is provided with connector-side electrodes A1 electrically connected to signal lines of the communication cable 2 via the matching circuit 10, the detection device 15 is provided with detection device-side electrodes A2 connected to the connector-side electrodes A1, and connection of the detection device-side electrodes A2 to the connector-side electrodes A1 allows the detection device 15 to receive the signal transmitted through the communication cable 2. The detection device-side electrodes A2 are connected to inputs of the amplifier circuit 11.

Also, the relay connector 4 is provided with connector-side electrodes B1 connected to inputs of the light-emitting circuit 13, the detection device 15 is provided with detection device-side electrodes B2 connected to outputs of the rectifier circuit 12, and connection of the detection device-side electrodes B2 to the connector-side electrodes B1 allows the output from the rectifier circuit 12 to be input to the light-emitting circuit 13.

Furthermore, the relay connector 4 is provided with connector-side electrodes C1 connected to power inputs of the light-emitting circuit 13, the detection device 15 is provided with detection device-side electrodes C2 connected to power outlets of the battery 14, and connection of the detection device-side electrodes C2 to the connector-side electrodes C1 allows power to be supplied from the battery 14 to the light-emitting circuit 13.

Although the detection device-side electrodes A2, B2 and C2 are formed in a pin shape and the connector-side electrodes A1, B1 and C1 in a plate shape parallel to the circuit board 6 in the present embodiment, the shapes of the both electrodes are not limited thereto. For example, as shown in FIG. 2, the detection device-side electrodes A2, B2 and C2 may be respectively electrically connected to the connector-side electrodes A1, B1 and C1 by connecting a detection device-side detection connector 31 housing the detection device-side electrodes A2, B2 and C2 to a connector-side detection connector 32 housing the connector-side electrodes A1, B1 and C1.

Figure 2:
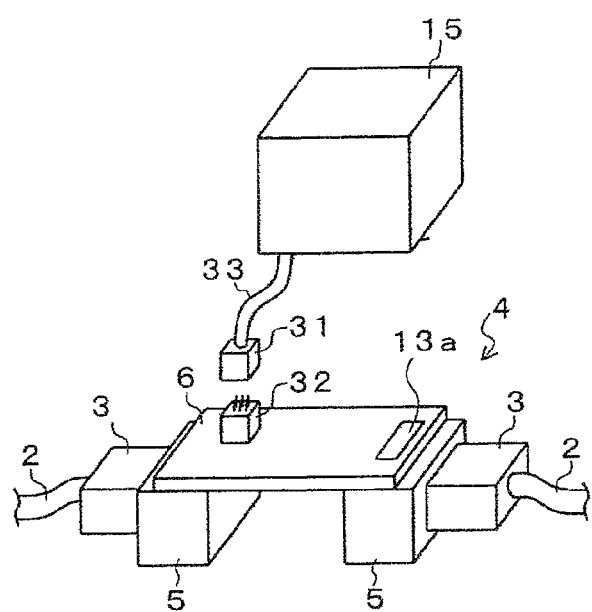
FIG. 2 is a perspective view showing a modified cable signal detector according to the invention.

Although FIG. 2 shows an example in which the detection device-side detection connector 31 is provided at an end of a detection cable 33 extending from the detection device 15, the detection cable 33 can be omitted. Alternatively, the connector-side detection connector 32 may be provided at an end of a detection cable extending from the relay connector 4. Providing a detection cable extending from the detection device 15 or the relay connector 4 facilitates connection of the two detection connectors 31 and 32.

As described above, the cable signal detector 1 in the present embodiment is provided with the amplifier circuit 11 for branching and extracting a portion of a signal transmitted through the communication cable 2, amplifying the extracted signal and outputting the amplified signal, and the light-emitting circuit 13 as a display portion to indicate the communication state based on the output from the amplifier circuit 11, the amplifier circuit 11 is mounted on the detection device 15 formed separately from the relay connector 4, and the relay connector 4 is configured to transmit the signal extracted from the communication cable 2 to the detection device 15.

By configuring as described above, it is possible to indicate the communication state of the communication cable 2 and thereby to prevent the communication cable 2 from being pulled out by mistake.

In addition, in the present embodiment, it is possible to use a universal communication cable as the communication cable 2 and the cost is therefore low since it is not necessary to provide a monitoring signal line, etc., in the communication cable 2, unlike the conventional technique.

Furthermore, in the present embodiment, since the amplifier circuit 11 is provided separately from the relay connector 4, deterioration of signal transmitted through the communication cable 2 caused by the amplifier circuit 11 can be prevented and also the size of the relay connector 4 can be smaller than the case where the amplifier circuit 11 is provided on the relay connector 4.

In addition, in case of providing multiple cable signal detectors 1, the detection device 15 can be shared among the cable signal detectors 1. Therefore, the cost of the entire system can be reduced as compared to the case where the amplifier circuit 11 and the rectifier circuit 12 are provided in each individual relay connector 4.

The present invention is not intended to be limited to the embodiment, and it is obvious that the various kinds of changes can be made without departing from the gist of the invention.

For example, although the light-emitting circuit 13 is provided on the relay connector 4 in the embodiment, the light-emitting circuit 13 may be provided on the detection device 15.

In addition, although the matching circuit 10 is provided on the relay connector 4 in the embodiment, the matching circuit 10 may be provided on the detection device 15.

Furthermore, although the rectifier circuit 12 is provided on the detection device 15 in the embodiment, the rectifier circuit 12 may be provided on the relay connector 4.

What is claimed is:

1. A cable signal detector for being provided at a connector at an end of a communication cable transmitting differential signals or at a relay connector to be connected to the connector to detect an existence of information communication, the cable signal detector comprising:
   an amplifier circuit that branches and extracts a portion of a signal transmitted through the communication cable, amplifies the extracted signal and outputs the amplified signal;
   a circuit board mounting connectors of the relay connector; and
   a display portion that displays the existence of information communication based on the output of the amplifier circuit, the display portion being mounted on the circuit board,
   wherein the amplifier circuit is mounted on a detection device formed separately from the connector or the relay connector, the detection device being connected to the circuit board, and
   wherein the connector or the relay connector is configured to transmit the extracted signal to the detection device.

2. The cable signal detector according to claim 1, further comprising a rectifier circuit that rectifies the signal amplified by the amplifier circuit into a DC signal and outputs the DC signal,
   wherein the rectifier circuit is provided at the detection device.

3. The cable signal detector according to claim 1, further comprising a matching circuit for adjusting the level of the signal extracted from the communication cable,
   wherein the matching circuit is provided at one of the connector, the relay connector and the detection device.

4. The cable signal detector according to claim 1, wherein the connector or the relay connector comprises a connector-side electrode electrically connected to a signal line of the communication cable,
   wherein the detection device comprises a detection device-side electrode connected to the connector-side electrode, and
   wherein a signal transmitted through the communication cable is received by the detection device upon connecting the detection device-side electrode to the connector-side electrode.

5. A cable signal detector comprising:
   a detection device;
   an amplifier circuit mounted on the detection device, and branching and extracting a portion of a signal transmitted through a communication cable, amplifying the extracted signal and outputting the amplified signal;
   a circuit board mounted on a connector at an end of the communication cable, the connector being formed separately from the detection device and configured to transmit the extracted signal to the detection device; and
   a display portion mounted on the circuit board and displaying an existence of information communication based on an output of the amplifier circuit.

6. The cable signal detector according to claim 5, further comprising:
   a matching circuit which provides impedance matching in a predetermined frequency band, and adjusts a level of the extracted signal.

7. The cable signal detector according to claim 6, further comprising:
   a rectifier circuit which rectifies the amplified signal into a DC signal and outputs the DC signal.

8. The cable signal detector according to claim 7, wherein the amplifier circuit comprises a grounded emitter circuit, the matching circuit comprises a resistive circuit, and the rectifier circuit comprises one of a full-wave rectifier circuit and a half-wave rectifier circuit.

9. The cable signal detector according to claim 7, wherein the display portion comprises a light-emitting circuit.

10. The cable signal detector according to claim 9, wherein the light-emitting circuit comprises a light emitting element mounted on the circuit board, and is configured to control the light emitting-element to emit light according to the output of the rectifier circuit.

11. The cable signal detector according to claim 9, wherein the amplifier circuit and the light-emitting circuit are configured to receive power from a battery in the detection device.

12. The cable signal detector according to claim 9, wherein the connector comprises first connector-side electrodes electrically connected to signal lines of the communication cable via the matching circuit, and the detection device comprises first detection device-side electrodes connected to the first connector-side electrodes, and
   wherein the detection device receives signals transmitted through the communication cable via a connection of the first detection device-side electrodes to the first connector-side electrodes.

13. The cable signal detector according to claim 12, wherein the first detection device-side electrodes are connected to an input of the amplifier circuit.

14. The cable signal detector according to claim 12, wherein the connector comprises second connector-side electrodes connected to inputs of the light-emitting circuit, and the detection device comprises second detection device-side electrodes connected to an output of the rectifier circuit, and wherein connection of the second detection device-side electrodes to the second connector-side electrodes allows the output of the rectifier circuit to be input to the light-emitting circuit.

15. The cable signal detector according to claim 14, wherein the connector comprises third connector-side electrodes connected to power inputs of the light-emitting circuit, and the detection device comprises third detection device-side electrodes connected to a power outlet of the battery, and wherein connection of the third detection device-side electrodes to the third connector-side electrodes allows power to be supplied from the battery to the light-emitting circuit.

16. The cable signal detector according to claim 15, wherein the first, second and third detection device-side electrodes comprise a pin shape and the first, second and third connector-side electrodes comprise a plate shape parallel to the circuit board.

17. The cable signal detector according to claim 5, wherein the connector comprises a signal transmission unit comprising four pairs of transmission paths corresponding to four pairs of signal lines in the communication cable.

* * * * *